(12) United States Patent
Allen et al.

(10) Patent No.: US 7,720,251 B2
(45) Date of Patent: May 18, 2010

(54) EMBEDDED APPLIANCE FOR MULTIMEDIA CAPTURE

(75) Inventors: Geoffrey Benjamin Allen, Potomac Falls, VA (US); Steven Lee Geyer, Herndon, VA (US); Rodney Dale McElrath, Raleigh, NC (US)

(73) Assignee: Echo 360, Inc., Dulles, VA (US)

( * ) Notice: Subject to any disclaimer, the term of this patent is extended or adjusted under 35 U.S.C. 154(b) by 488 days.

(21) Appl. No.: 11/472,997

(22) Filed: Jun. 23, 2006

(65) Prior Publication Data
US 2008/0034400 A1 Feb. 7, 2008

(51) Int. Cl.
*G06K 9/00* (2006.01)

(52) U.S. Cl. .............. 382/100; 348/211.99; 348/211.11

(58) Field of Classification Search .................. 382/100
See application file for complete search history.

(56) References Cited

U.S. PATENT DOCUMENTS

| | | | |
|---|---|---|---|
| 5,544,315 A | | 8/1996 | Lehfeldt et al. |
| 6,067,624 A * | | 5/2000 | Kuno ........................... 726/17 |
| 6,271,752 B1 * | | 8/2001 | Vaios ......................... 340/541 |
| 6,323,897 B1 * | | 11/2001 | Kogane et al. .............. 348/159 |
| 6,564,380 B1 * | | 5/2003 | Murphy ........................ 725/86 |
| 6,803,945 B1 * | | 10/2004 | Needham ................. 348/207.1 |
| 6,845,182 B2 * | | 1/2005 | Matsuo ....................... 382/305 |
| 6,965,398 B2 * | | 11/2005 | Arakt ....................... 348/211.3 |
| 6,980,232 B2 * | | 12/2005 | Suzuki ..................... 348/207.1 |
| 7,154,538 B1 * | | 12/2006 | Fukasawa et al. ......... 348/211.3 |
| 7,239,343 B2 * | | 7/2007 | Ohsawa et al. ............ 348/211.3 |
| 7,272,845 B2 * | | 9/2007 | Creamer et al. ............. 725/105 |
| 7,298,930 B1 * | | 11/2007 | Erol et al. .................... 382/305 |
| 7,423,670 B2 * | | 9/2008 | Kawai et al. ............ 348/211.99 |
| 7,425,987 B2 * | | 9/2008 | Creamer et al. ........... 348/211.3 |
| 7,428,005 B2 * | | 9/2008 | Creamer et al. ........... 348/211.3 |
| 7,446,801 B2 * | | 11/2008 | Iizuka ...................... 348/211.4 |
| 2001/0017655 A1 * | | 8/2001 | Arakt .......................... 348/211 |
| 2001/0017656 A1 * | | 8/2001 | Araki et al. .................. 348/211 |
| 2001/0027493 A1 | | 10/2001 | Wallace |
| 2003/0067543 A1 * | | 4/2003 | Okada et al. ............. 348/207.1 |
| 2003/0189649 A1 * | | 10/2003 | Kuno ....................... 348/211.1 |
| 2004/0051787 A1 * | | 3/2004 | Mutsuro et al. ........ 348/211.99 |
| 2004/0056964 A1 * | | 3/2004 | Kawai et al. ............. 348/211.1 |
| 2004/0225743 A1 | | 11/2004 | Huggins et al. |
| 2005/0050577 A1 | | 3/2005 | Westbrook et al. |
| 2006/0070105 A1 * | | 3/2006 | Kawai .......................... 725/86 |
| 2006/0136803 A1 * | | 6/2006 | Erol et al. .................... 715/500 |

OTHER PUBLICATIONS

International Search Report and Written Opinion for International Application No. PCT/US07/71872, mailed Sep. 15, 2008, 7 pages.

* cited by examiner

*Primary Examiner*—Sath V Perungavoor
(74) *Attorney, Agent, or Firm*—Cooley Godward Kronish LLP

(57) ABSTRACT

A multimedia device includes input ports dedicated to receiving a real-time media signal and a processor system dedicated to capturing the real-time media signal. The processor system defines an embedded environment. The input ports and the processor system are integrated into the multimedia capture device. The input ports include an audio input port and at least one of a visual-capture input port or a digital-image input port.

26 Claims, 5 Drawing Sheets

EMBEDDED APPLIANCE FOR MULTIMEDIA CAPTURE

FIELD OF INVENTION

The invention relates generally to an apparatus and method for media signal capture, and more particularly to an apparatus and method for capturing media signals using an embedded appliance.

BACKGROUND

The ability to capture live media recordings of, for example, classroom instruction and meetings for on-demand availability and time-shifted viewing has become valuable to institutions such as universities and businesses. Although some commercial solutions for capturing and publishing live recordings are known, these solutions are often implemented on general purpose devices such as a personal computer (PC). Because these PC-based capture solutions use general purpose components and software, they are expensive, difficult to maintain, inefficient when capturing and storing signals, vulnerable to security threats, require special technical support and can be difficult to integrate into, for example, a smart classroom environment. Thus, a need exists for a purpose-built multimedia capture device.

SUMMARY OF THE INVENTION

A multimedia device includes input ports dedicated to receiving a real-time media signal and a processor system dedicated to capturing the real-time media signal. The processor system defines an embedded environment. The input ports and the processor system are integrated into the multimedia capture device. The input ports include an audio input port and at least one of a visual-capture input port or a digital-image input port.

DETAILED DESCRIPTION

An embedded appliance for multimedia capture (also referred to herein as an "embedded appliance") is a device dedicated to capturing, processing, storing and/or sending real-time media signals (e.g. audio signal, video signal, visual-capture signal, digital-image signal). The embedded appliance can capture real-time media signal(s) that can include digital-image signals, visual-capture signals, audio signals and/or video signals of, for example, an in-progress classroom presentation. After the media signal(s) have been captured, the embedded appliance can process the signal(s) by, for example, compressing, indexing, encoding, decoding, synchronizing and/or formatting the content. Embedded appliances can be, for example, distributed throughout a network and coordinated according to a schedule to capture, process, store and send the real-time media signals for eventual retrieval by a user from, for example, a control server and/or a server(s) configured as, for example, a course management system. Media streams being captured on the embedded appliance optionally can also be monitored and/or further processed by a control server before distribution.

As a dedicated (i.e., specific-purpose) device having an embedded environment, the embedded appliance uses a hardened operating system (OS) and a processor (e.g., processor system) to capture, process, store and/or send real-time media signals. The hardened OS is configured to resist security attacks (e.g., prevent access by an unauthorized user or program) and facilitate functions related only to the capturing, processing, storing and/or sending of real-time media signals. In other words, the hardware and software within the embedded appliance are integrated into and designed specifically for capturing, processing, storing and/or sending real-time media signals. Because the hardware and software for capturing, processing, storing and/or sending real-time media signals are integrated into the embedded environment of the embedded appliance, the costs and complexity associated with installation, scaling, design, deployment and technical support can be lower than that for a general purpose system.

A real-time media signal represents an image and/or a sound of an event that is being acquired by a sensor at substantially the same time as the event is occurring and that is transmitted without a perceivable delay between the sensor when acquired and an embedded appliance. The capturing, processing, storing and/or sending of the real-time media signals by the embedded appliance can be performed at any time. Throughout the specification, real-time media signals are also referred to as media signals.

Figure 1:
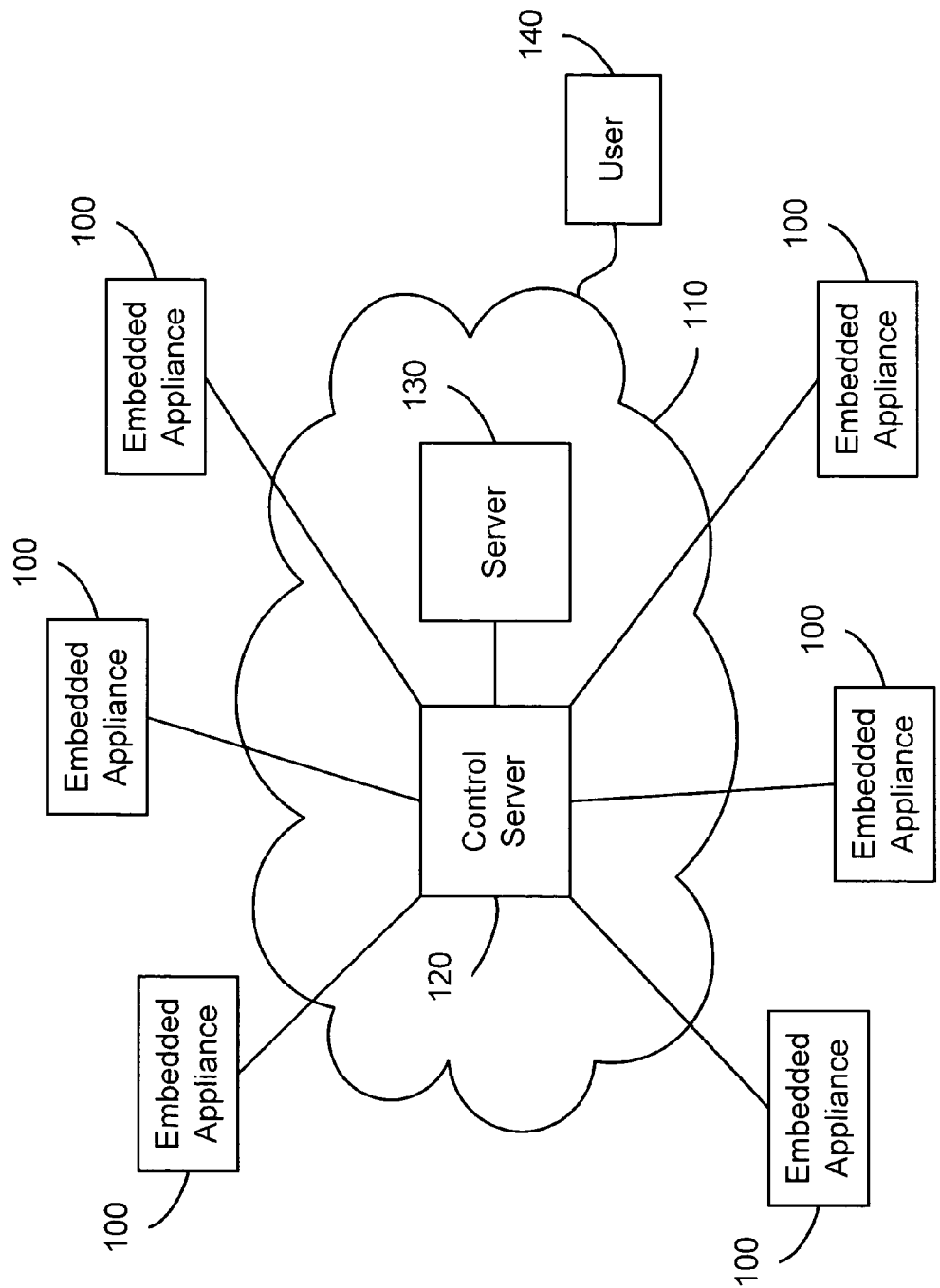
FIG. 1 is a system block diagram that illustrates embedded appliances coupled to a control server over a network, according to an embodiment of the invention.

FIG. 1 is a block diagram that illustrates embedded appliances 100 distributed across a network 110 and connected to a control server 120. The control server 120, in this embodiment, is connected with a server 130 that is configured, for example, as a course management system (e.g., a server running Blackboard™ or WebCT). The network 110 can be any type of network including a local area network (LAN) or wide area network (WAN) implemented as a wired or wireless network in a variety of environments such as, for example, an office complex or a university campus. The embedded appliances 100 can capture real-time media signals including audio signals, visual-capture signals, digital-image signals and video signals acquired through electronic capture devices or sensors such as microphones, web cameras, video cameras, still cameras and video players. The embedded appliances 100 can also be configured to process, store and/or send captured real-time media signals. Data associated with the content captured by real-time media signals can also be processed, stored, and/or sent; such data can include, for example, capture time, capture location, and/or speaker's name.

The embedded appliances 100 can be prompted to start and stop capturing real-time media signals in response to start and stop indicators generated by, for example, the control server 120 or the embedded appliances 100. The start and stop indicators can be generated according to a schedule determined and/or stored by the control server 120 and/or each embedded appliance 100. If implemented in, for example, a university campus environment, embedded appliances 100 can be fixed in university classrooms and connected via a university communications network. An embedded appliance 100 can be prompted, for example, according to a schedule stored on the embedded appliance 100 to capture media signals from a particular university classroom at a specific time.

Media signals captured by each embedded appliance 100 are processed, stored and sent to a control server 120. The control server 120 receives the media signals and sends them to the server 130 where the content of the media signals are made available for distribution. In some embodiments, the content of the media signals can be made available for distribution to a user 140 at the control server 120. In some embodiments, further processing of the media signals can be performed on the control server 120 and/or another processing device (not shown) before the content of the media signals is made available for distribution. The embedded appliances 100 and/or control server 120 can process the media signals by, for example, compressing, indexing, encoding, decoding, synchronizing and/or formatting the media signals.

The embedded appliances 100 can be prompted to start and stop sending processed real-time media signals in response to start and/or stop indicators generated by, for example, the control server 120 or the embedded appliance 100. The start and/or stop indicators can be generated according to a schedule or according to defined conditions. In some embodiments, the start and/or stop indicator can be a trigger signal generated by a trigger generator within a control server and received by a trigger receiver within an embedded appliance. More details regarding trigger signals in the context of video signal capturing are set forth in co-pending application Ser. No. 10/076,872, publication no. US 2002/0175991 A1, "GPI Trigger Over TCP/IP for Video Acquisition," which is incorporated herein by reference.

The embedded appliances 100 can also be configured to send media signals after any stage of processing. For example, an embedded appliance 100 can be configured to send media signals to a control server 120, based on network traffic conditions, unsynchronized and unformatted portions of audio and digital-images signals after the signals have been compressed. The control server 120 can be configured to synchronize and format the audio and digital-image signals received from the embedded appliance 100.

The capturing of media signals on the embedded appliance 100 can also be monitored by the control server 120 through, for example, a confidence monitoring signal. The confidence monitoring signal can be used by the control server 120 to determine whether a particular embedded appliance 100 is properly capturing media signals according to, for example, a schedule. The confidence monitoring signal can include any combination of media signals or portions (e.g., split signal) of any of the media signals that are captured and/or detected by an embedded appliance 100. For example, the confidence monitoring signal can be a frame/image acquired periodically from a video signal. The confidence monitoring signal can be a compressed or uncompressed media signal. The confidence monitoring signal can also be a separate signal/indicator generated based on the media signal indicating that a media signal is being captured. For example, the confidence monitoring signal can be a binary indicator that indicates that a particular media signal is either being captured or not captured by an embedded appliance 100.

Although FIG. 1 only shows a single control server 120 connected with multiple embedded appliances 100 in some embodiments, in other embodiments, more than one control server 120 can be connected with any combination of embedded appliances 100. For example, two control servers 120 can be configured to coordinate the capturing, processing, storing and/or sending of media signals captured by embedded appliances 100. The embedded appliances 100 can be programmed to recognize multiple control servers 120 and can be programmed to, for example, send a portion of a processed media signal to one of the control servers 120.

Figure 2:
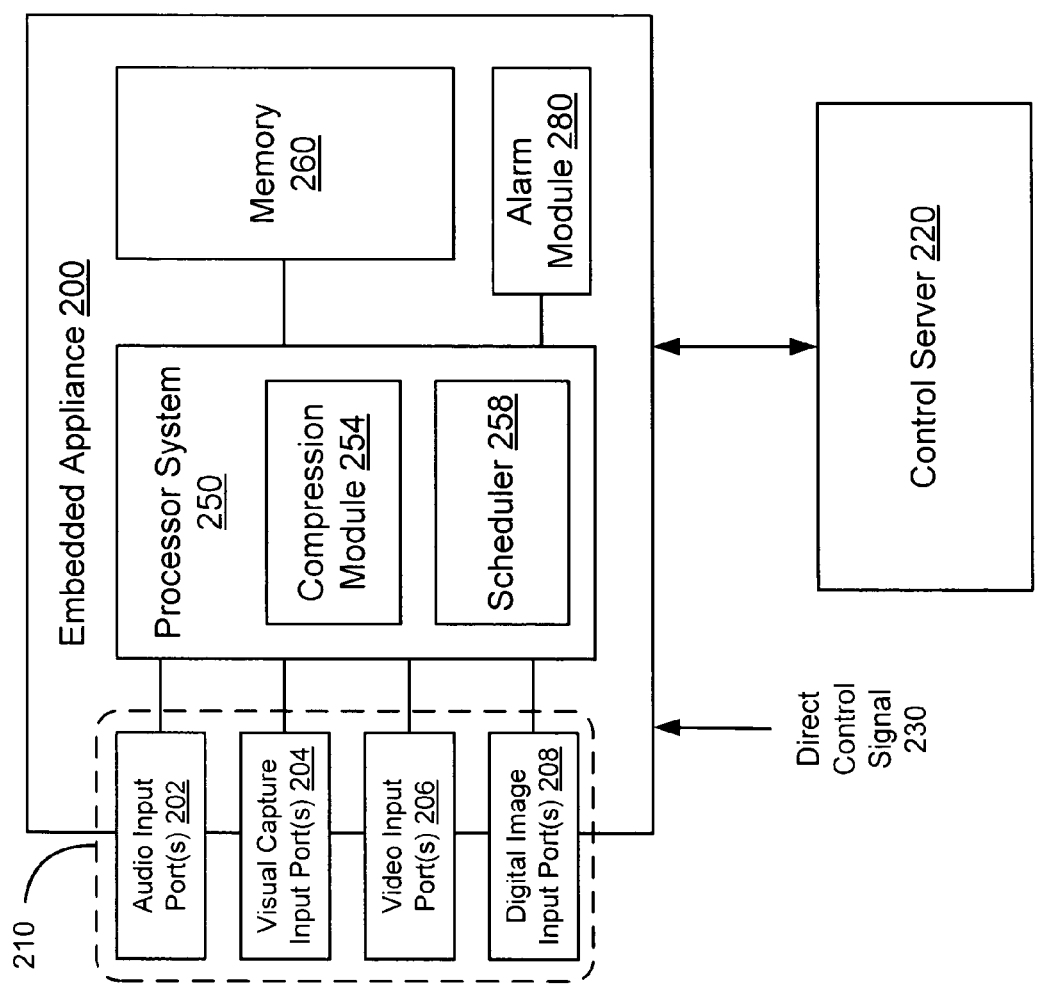
FIG. 2 is a system block diagram that illustrates an embedded appliance having input ports, a processor system, a memory and an alarm module, according to an embodiment of the invention.

FIG. 2 is a system block diagram that illustrates an embedded appliance 200 with input ports 210, a processor system 250, a memory 260 and an alarm module 280. The embedded appliance 200 captures real-time media signals from various electronic devices via the input ports 210 in response to start and stop indicators generated by a scheduler 258 in the processor system 250. The processor system 250 receives and compresses the media signals using a compression module 254. The processor system 250 can use the memory 260 to perform any function related to the embedded appliance 200 such as storing compressed media signals. The embedded appliance 200 captures and transmits compressed media signals to the control server 220 when prompted by the scheduler 258. The captured media signals can be sent to the control server 220 as, for example, a multiplexed signal over a network connection via an output port (not shown) of embedded appliance 200.

The input ports 210 include an audio input port(s) 202, a visual-capture input port(s) 204, a video input port(s) 206 and a digital-image input port(s) 208. Each of the input ports 210 are integrated as part of the embedded environment of the embedded appliance 200. The media signals captured by the inputs ports 210 can be received as an analog signal or as a digital signal. If received as an analog signal, the processor system 250 can convert the analog signal into a digital signal and vice versa.

The audio input port(s) 202 is used to capture an audio signal. The audio input port(s) 202 can be, for example, an RCA stereo audio input port(s), a ¼" jack stereo audio input port(s), XLR input port(s) and/or a universal serial bus (USB) port(s). The audio signal can be produced by any type of device capable of producing an audio signal, for example, a stand alone microphone or microphone connected to a video camera.

The visual-capture input port(s) 204 receives a digital or analog video-graphics-array (VGA) signal through, for example, a VGA input port(s), digital visual interface (DVI) input port(s), extended graphics array (XGA) input port(s), HD-15 input port(s) and/or BNC connector port(s). The visual-capture input port 204 captures images produced by, for example, a computer or a microscope. An electronic device connected to the visual-capture input port 204 can also be used to capture images from, for example, an electronic whiteboard transmitting images via, for example, a VGA signal.

The video input port(s) 206 receives motion video signals from devices such as video cameras via an input port(s) that includes, but is not limited to, an s-video input port(s), composite video input port(s) and/or component video input port(s).

The digital-image input port(s) 208 captures digital-images via an input port(s) such as an Ethernet port(s) and/or a USB port(s). The digital-images can be acquired using, for example, a digital camera or a web camera.

The hardware components in the processor system 250, which can include, for example, application specific integrated circuits (ASICs), central processing units (CPUs), modules, digital signal processors (DSPs), processors and/or co-processors, are configured to perform functions specifically related to capturing, processing, storing and/or sending media signals.

The embedded appliance 200 captures any combination of real-time media signals received through the input ports 210 using the processor system 250. Each of the media signals, although collected via different input ports 210, are synchronously acquired by the embedded appliance 200. For example, even though the sound of chalk against a classroom board can be received via a microphone through the audio input port 202, the motion of a professors hand wielding the chalk can be received synchronously using a video camera connected to the video input port 206. These media signals are synchronously received and processed by the embedded appliance 200.

In some embodiments, the embedded appliance 200 can be configured to capture only certain portions of media signals. The embedded appliance 200 can be configured to, for example, capture and store sounds received via a microphone while ignoring static and/or silence. The embedded appliance 200 can also be configured to, for example, capture a video signal or a digital-image signal only when movement or a substantial change in a scene is detected. In many embodiments, each of the input ports 210 included in the embedded appliance 200 can be configured to capture one or more media signals at different and/or variable rates. For example, the video input port 206 can be configured to receive video signals at a high frame rate compared with a frame rate of digital images received by the digital-image input port 208.

The processor system 250, using the compression module 254, can compress the media signals as they are received. The compression module 254 can compress, for example, an audio signal and a synchronously received digital VGA signal into a number of compression formats such as, for example, a motion pictures experts group (MPEG) layer 2 format. The compression module 254 can also compress media signals into more than one format simultaneously. For example, if receiving a digital-image signal and an associated audio signal, the digital-image signal can be compressed into a joint photographic experts group (JPEG) format while the audio signal can be compressed into an MPEG audio layer 3 (MP3) format. In some embodiments, the compression module 254 can compress a single media signal into multiple formats simultaneously. Similarly, one or more media signals can be compressed into a single compressed stream (e.g., MPEG-4).

The compression module 254 can be configured to adjust a multiplicity of variables including the frame rates, bit rates, frequency, resolution, color and stabilization of the input signals using any combination of lossy or lossless formats using one or more codecs. A codec is a device, hardware module and/or software module configured to encode and/or decode, for example, a captured media signal. The compression module 254 can also be configured to simultaneously compress, decompress, encode and/or decode any combination of media signals into any combination of formats. The formats do not have to be compatible with one another.

In some embodiments, the processor system 250 and the compression module 254 can be configured to use, for example, different codecs depending on the type of input device that is connected to an input port 210. For example, if a web camera is used to capture digital-images via the digital-image input port 208, the images can be compressed into a tiff format, but if a digital still camera is used to capture a digital-image signal, the processor system 250 and compression module 254 can be programmed or otherwise configured to detect the difference and use a JPEG compression codec instead.

After the processor system 254 compresses media signals, the compressed media signals are stored in the memory 260 for later sending to, for example, the control server 220 for further processing. The memory 260 can be any appropriate type of fixed and/or removable storage device. The memory can be, but is not limited to, a tape, digital-video-disk (DVD), digital-video-cassette (DVC), random-access-memory (RAM), flash memory and/or hard disk drive. The size of the memory 260 can vary depending on the amount of storage needed for a particular application. For example, the size of the memory 260 can be increased if an embedded appliance 200 is intended to capture large quantities of media signals compressed in a lossless format. The size of the memory 260 can also be increased if an embedded appliance 200 is intended to, for example, capture media signals over relatively long periods of time (e.g., during network down time) without uploading captured media signals to, for example, the control server 220. The memory 260 can be used to prevent the loss of captured media signals that cannot be sent to, for example, a control server because of a network outage. In some embodiments, the processor system 250 can, if necessary, use the memory 260 to buffer information received via the input ports 210 before compression.

The processor system 250 also includes a scheduler 258 that can generate start and stop indicators to prompt the embedded appliance 200 to, for example, start and stop capturing and/or start and stop sending media signals. The scheduler 258 can access a schedule that is either stored locally on the embedded appliance 200 or on the control server 220. The schedule can include, for example, start and stop times that are specific to input ports 210. For example, if a professor will teach a one-hour class on one day of the week, every week for four months, the scheduler 258 can use a schedule to prompt the embedded appliance 200 to capture the professor's lecture for one hour on the day of the lecture every week for the four-month time period. The scheduler 258 can be configured to capture or send media signals according to more than one schedule stored on, for example, the embedded appliance 200.

The scheduler 258 can generate a schedule or receive a schedule from the control server 220. For example, the scheduler 258 can generate a schedule for sending captured media signals based on input from the control server 220 indicating preferred transmission times. In some embodiments, the scheduler 258 can access and execute a schedule that is, for example, sent from the control server 220 and stored in the memory 260 of the embedded appliance 200. In some embodiments, the scheduler 258 can be used to start and stop not only the capturing and/or sending of media signals by the embedded appliance 200, but also the processing and/or storing of media signals.

Rather than using a schedule to prompt the capturing and/or sending of media signals, the scheduler 258 can prompt certain functions to be performed based on defined criteria. For example, the scheduler 258 can be configured to prompt the sending of media signals from the embedded appliance 200 when a certain amount of bandwidth is available for use by the embedded appliance 200. In some embodiments, the scheduler 258 is included as a hardware and/or software module that is separate from the processor system 250.

In some embodiments, rather than a processor system 250 having multiple processors, the embedded appliance includes a single processor that can be any type of processor (e.g., embedded processor or a general purpose processor) configured to define and/or operate within an embedded environment. The single processor can be configured to execute the functions performed by the processor system 250 and/or other functions within the embedded appliance 200. In some embodiments, the processor system 250, in addition to the compression module 254, can include other processors and/ or co-processors that are configured to operate in the embedded environment of the embedded appliance 200.

In some alternative embodiments, the functions of the scheduler in the embedded appliance can be performed by the control server. In such embodiments, if all of the functions of the scheduler are performed by the control server, the embedded appliance can be designed without the scheduler. For example, the control server can store schedules associated with each embedded appliance distributed throughout a network and can send start and stop indicators to each embedded appliance to capture and/or send media signals.

In some embodiments, the start and stop indicators from the control server 220 can be based on variables such as the storage and/or sending capacity of each embedded appliance 200. The control server 220 can query each embedded appliance 200 to determine, for example, how much memory 260 capacity each embedded appliance 200 has available. The control server 220 can also, for example, receive a signal from each embedded appliance 200 indicating how much memory 260 capacity each embedded appliance 200 has available. The control server 220 can then prioritize and prompt the sending of information from the embedded appliances 200 based on memory capacity indicators.

As FIG. 2 shows, the embedded appliance 200 can include an alarm module 280 that is a hardware and/or software module. The alarm module 280 can include both an output port (not shown) for sending a signal and an input port for receiving a signal. The alarm module 280 can be used to send a signal to the control server 220 in the event of a physical security breach. For example, if the position of the embedded appliance 200 is changed from its fixed position in, for example, a conference room in a building, the alarm module 280 can send a signal indicating that a physical breach has occurred. The alarm module 280 can send, for example, an identifier associated with the embedded appliance 200 so that the breached embedded appliance 200 can be identified by, for example, the control server 220. In addition to alternatively, the control server 220 can send, for example, a ping signal to the alarm module 280 to determine whether the embedded appliance 200 is functioning properly and/or has been physically breached (e.g., removed).

FIG. 2 also illustrates that the embedded appliance 200 can be controlled using a direct control signal 230 from, for example, a user. The embedded appliance 200 can include an interface such as a graphical user interface (GUI) (not shown), physical display (not shown) or buttons (not shown) to produce the direct control signal 230 to control some or all of the functions that can be performed by the embedded appliance 200. The direct control signal 230 can be used to, for example, modify a schedule stored on the embedded appliance 200, modify the processing of media signals, troubleshoot an error on the embedded appliance 200 or control the embedded appliance, for example, while the control server 220 is down. The direct control signal 230 can also be used to, for example, start and stop capturing and/or sending of media signals. The embedded appliance 200 can be configured to require authentication (e.g., username/password) of, for example, a user before accepting a direct control signal 230 sent via an interface (not shown) from the user. The direct control signal 230 can also be generated using, for example, an interface (not shown) that is not directly coupled to the embedded appliance 200. In some embodiments, the embedded appliance can be directly controlled using the control server 220.

In some embodiments, the processor system 250 can include other software and/or hardware modules to perform other processing functions such as, for example, encoding, decoding, indexing, formatting and/or synchronization of media signals. In some embodiments, the embedded appliance 200 can be configured without a compression module 245 and can send uncompressed media signals to the control server 220.

Figure 3:
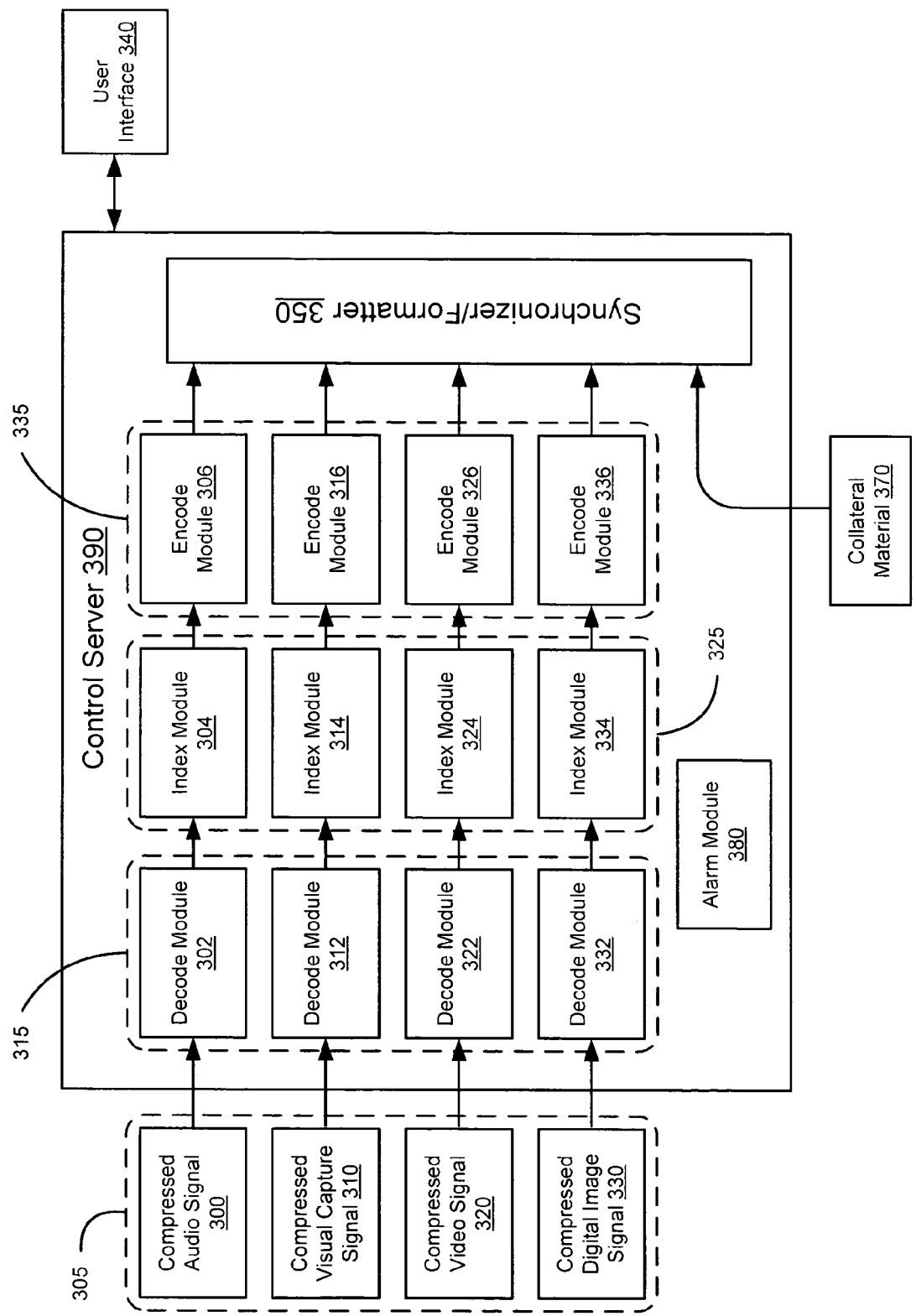
FIG. 3 is a block diagram that shows the flow of media signals through modules in a control server, according to an embodiment of the invention.

FIG. 3 is a block diagram that shows the flow of media signals from an embedded appliance through modules in a control server 390. The control server 390 receives separate compressed real-time media signals 305 including a compressed audio signal 300, compressed visual-capture signal 310, compressed video signal 320 and compressed digital-image signal 330. Although this figure shows that each of the media signals 305 are received separately, the media signals 305 can be received by the control server 390 over, for example, an internet protocol (IP) network connection as a multiplexed signal that can be de-multiplexed by the control server 390 when received. In some embodiments, the media signals 305 can be combined into one or more signals encoded into one or more formats by the embedded appliance that can be decoded and separated by the control server 390 when received. For example, audio and video signals can be combined into a single MPEG-2 signal before being sent by an embedded appliance to the control server 390. Also, the control server 390 can receive media signals 305 from more than one embedded appliance and can process each of the media signals 305 in parallel using, for example, multithreaded processing.

Each of the compressed media signals 305 that are received by the control server 390 are similarly processed. Each of the signals 305 can be processed by one of the decode modules 315, index modules 325 and encode modules 335. After each of the media signals 305 has been processed (e.g., individually processed, processed as a group), the signals are synchronized and/or formatted by the synchronizer/formatter 350.

The processing of the compressed video signal 320 will be used as a representative example of the processing of the compressed media signals 305. The processing of the remaining signals 305 can be understood in light of this representative example.

When the compressed video signal 320 is received by the control server 390, the signal is decompressed from its compressed format by the decode module 322 into a decoded video signal. The decode module 322 can be configured to detect the format of the compressed video signal 320 when it is received to properly decode/decompress the signal 320. The compressed video signal 320, when converted into a decoded video signal, can be decoded to its original format or into any other format that can be used by the control server 390 to continue processing the signal. In some embodiments, the compressed video signal 320 can be received in a format that can be processed by the control server 390 without decoding. In this scenario, the compressed video signal 320 can be shunted around the decode module 322.

The decoded video signal is then processed by the index module 324 to index the decoded video signal by, for example, determining and marking scene changes. The indexing is performed so that the decoded video signal can later be properly synchronized with the other media signals 305 by the synchronizer/formatter 350 and to provide relevant index points for use by, for example, an end-user (not shown). Segments, rather than scenes, are detected from the compressed audio signal 300 using the index module 304 so that the compressed audio signal 300 can be properly synchronized with the other media signals 305 and to provide relevant index points for use by, for example, an end-user (not shown). The decoded video signal with indexing (e.g., scene change markings) is then encoded by the encode module 326 into an encoding that can be synchronized and formatted by the synchronizer/formatter 350.

Returning to the general discussion of FIG. 3, the synchronizer/formatter 350 receives the media signals 305 after processing through the decode 315, index 325 and encode 335 modules. The synchronizer/formatter 350 indexes, synchronizes and formats the media signals so that they can be accessed by a user via a user interface 340. In the synchronization process, the scenes from each of the media signals and the audio segments are synchronized so that, for example, the sound of a dropped pen hitting a floor is matched with video of the pen hitting the floor. The synchronized media signal can be formatted by the synchronizer/formatter 350 into any format that can be used by a user.

The synchronizer/formatter 350 can receive collateral material 370 and can combine collateral material 370 with the media signals 305 that have been processed by the modules. The collateral material 370 can be, for example, additional marking information that can be combined with the processed media signals to aid in the synchronizing process. In some embodiments, the collateral material can be additional media signals captured by other multimedia capture devices (not shown) that are to be combined with the media signals 305 already shown. Although not shown in FIG. 3, the control server 390 can include separate modules that decode, index (e.g., scene/segment detect or optical character recognition) and/or encode the collateral material 370 received by the control server 390.

Although FIG. 3 shows that separate modules perform decoding, indexing, encoding, synchronizing and formatting, the functions of each of the modules can be further subdivided and/or combined into one or more processors or modules. These functions can also be subdivided and/or combined onto more than one control servers. Also, the control server 390 can include a memory (not shown) or a separate database (not shown) for storing information and/or buffering information that is received from one or more embedded appliances.

Any combination of the functions performed by any of the modules and/or other component of the control server 390 can alternatively be performed on an embedded appliance. For example, the indexing can be performed by an embedded appliance before the media signals are compressed and transmitted to the control server 390.

The control server 390 can also receive an input signal from a user via the user interface 340. The user interface 340 can be, for example, a remote computer that is interfacing with the control server 390 via a network connection and/or can be an interface that is integrated into the control server 390. The user interface 340 can be used to control any of the modules and their associated functions and/or to specify parameters for processing information on the control server 390. A user input signal can specify, for example, the type of format that should be used by the synchronizer/formatter 350 for a particular set of media signals 305 received at the control server 390. A user interface 340 can be configured so that a user can manually manipulate any of the media signals 305 received by embedded appliances distributed across a network.

The user interface 340 can also be used to access, monitor and/or control any embedded appliances (not shown) that can be connected to the control server 390 and distributed, for example, over a network. Access to embedded appliances and/or the control server 390 via the user interface 340 can be, for example, password protected. The user interface 340 can be used to define, for example, schedules used by the embedded appliance or schedules used by the control server to send signals to start and stop capturing, processing, storing and/or sending by distributed embedded appliances. The user interface 340 can also be used to view confidence monitoring signals that can be generated by embedded appliances connected to the control server 390.

The user interface 340 can also be used to access the final synchronized/formatted content generated by the control server 390. More than one user interface 340 can be distributed across a network and can be configured to access the content produced by the control server 390 (e.g., personal computers distributed over a university network accessing the control server 390). In some embodiments, the control server 390 sends the content to a server (not shown) where the content is made available to one or more users through a user interface 340.

As FIG. 3 shows, the control server 390 includes an alarm module 380 for detecting a security breach with any embedded appliance that can be associated with the control server 390. The alarm module 380 can be used to send a signal to, for example, a user via the user interface 340 in the event of a physical breach of an embedded appliance (not shown). In some embodiments, the alarm module 380 can be programmed to send an indicator via, for example, e-mail to user indicating that a particular embedded appliance has been breached in a particular way.

Figure 4:
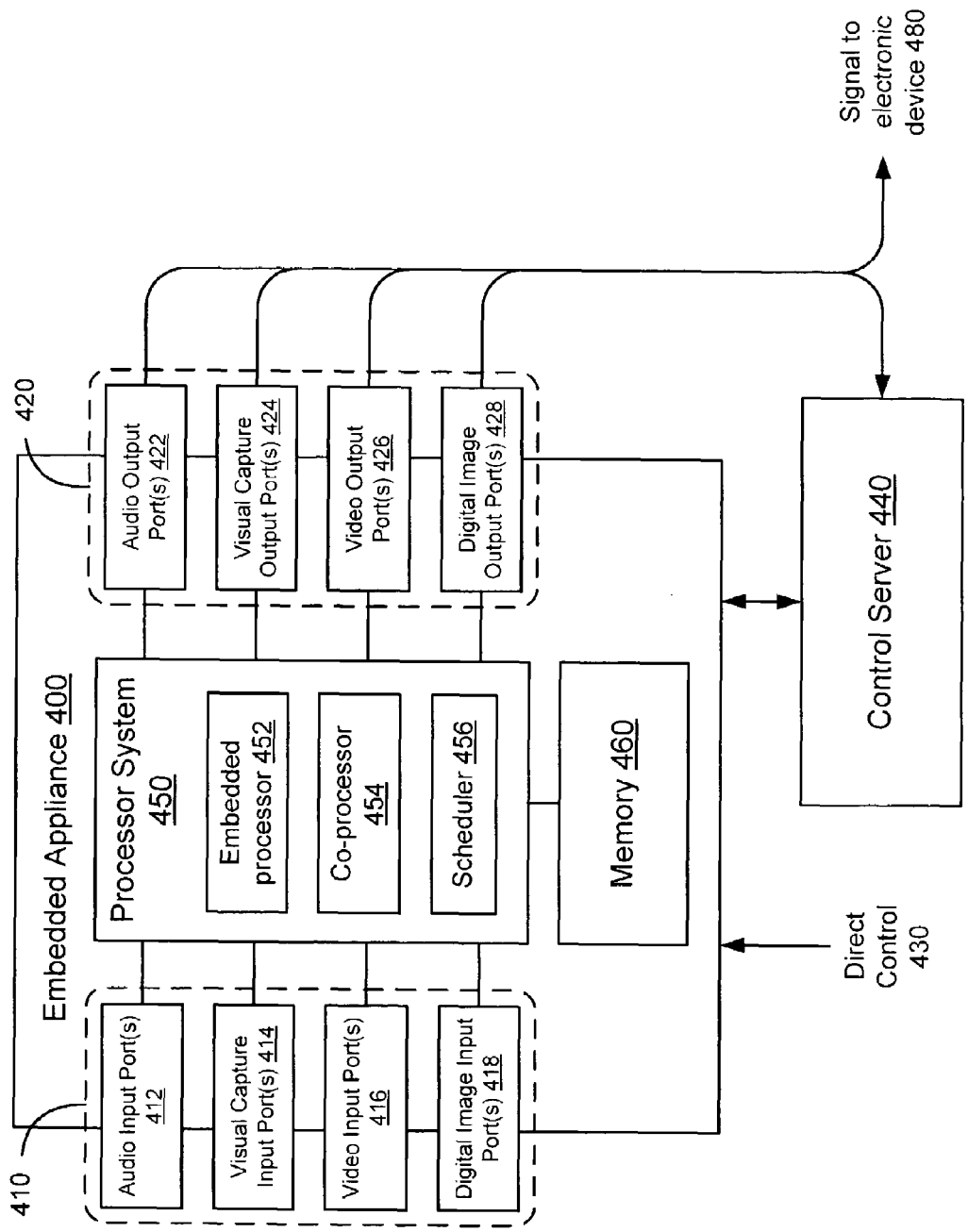
FIG. 4 is a system block diagram of an example embodiment of an embedded appliance having input ports, output ports, a processor system and a memory, according to an embodiment of the invention.

FIG. 4 is a system block diagram of an example embodiment of an embedded appliance 400 with input ports 410, output ports 420, a processor system 450 and a memory 460. The embedded appliance 400 captures real-time media signals from electronic devices (e.g., microphone, camera) via the input ports 410 in response to start and stop indicators generated by a scheduler 456. The processor system 450 accesses the memory 460 to perform functions related to the embedded appliance 400 such as storing processed media signals. The embedded appliance 400 transmits processed media signals via the output ports 420 to the control server 440.

The input ports 410 include an audio input port(s) 412, a visual-capture input port(s) 414, a video input port(s) 416 and a digital-image input port(s) 418. Each of the output ports 410 is configured to output a media signal that corresponds with an input port 420. The output ports 420 include an audio output port(s) 422, a visual-capture output port(s) 424, a video output port(s) 426 and a digital-image output port(s) 428. The output ports 420 can be used to transmit processed media signals to the control server 440 that are stored in, for example, the memory 460. The output ports 420 can also be used to output a signal such as a confidence monitoring signal to, for example, the control server 440 or to other electronic devices 480.

The processor system 450 includes an embedded processor 452, a co-processor 454 and a scheduler 456. The embedded processor 452 and/or co-processor 454 can be, for example, a digital signal processor (DSP) dedicated to processing media signals by capturing, compressing, encoding, decoding, indexing, synchronizing and/or formatting the media signals. The co-processor 454 can be, for example, a processor such as a field programmable gate array (FPGA) that is programmed to control the functions performed by the embedded processor 452. The co-processor 454 and/or embedded processor 452 can, for example, include the scheduler 456 as a module. In some embodiments, the scheduler 456 is included as a module that is separate from the processor system 450.

In some embodiments, rather than a processor system 450 having multiple processors, the embedded appliance includes a single processor that can be any type of processor (e.g., embedded processor or a general purpose processor) configured to define and/or operate within an embedded environment. The single processor can be configured to execute the functions performed by the processor system 450 and/or other functions within the embedded appliance 400. In some embodiments, the processor system 450, in addition to the embedded processor 452 and co-processor 456, can include other processors and/or co-processors that are configured to operate in the embedded environment of the embedded appliance 400.

The processor system 450 and/or other processors (not shown) that are not included in the processor system 450 can be configured to perform additional functions for the embedded appliance 400. For example, the processor system 450 can be configured to support splitting of captured media signals. In such a case, the processor system 450 can be configured to include hardware and/or software modules such as, for example, a visual-capture distribution-amplifier (e.g., an on-board VGA distribution amplifier), a visual-capture signal splitter, and/or a visual-capture sync stabilizer. Some combinations of these hardware and/or software modules can enable the embedded appliance 400 to capture, for example, a VGA signal via the visual-capture input port 414 and return a copy of the signal (also referred to as a split signal) to an electronic device 480 (e.g., classroom projector) via the visual-capture output port 424. Using these hardware and/or software modules, the processor system 450 can also be configured to synchronize and stabilize a split media signal before the signal is transmitted to an electronic device 480.

In some embodiments, the processor system 450 can be programmed to support, for example, an Ethernet switch (not shown) (e.g., a multi-port fast Ethernet switch, Gigabit Ethernet switch) and/or a power-over-Ethernet (PoE) port (not shown). Some embodiments of the embedded appliance 400 can include integrated relays (not shown) to shunt the signal (e.g., visual-capture input signal) through the embedded appliance 400 in case of a power failure. The integrated relays can pass media signals through the embedded appliance and out of the output ports 420 to, for example, a classroom projector if power to the embedded appliance 400 is disrupted.

Figure 5:
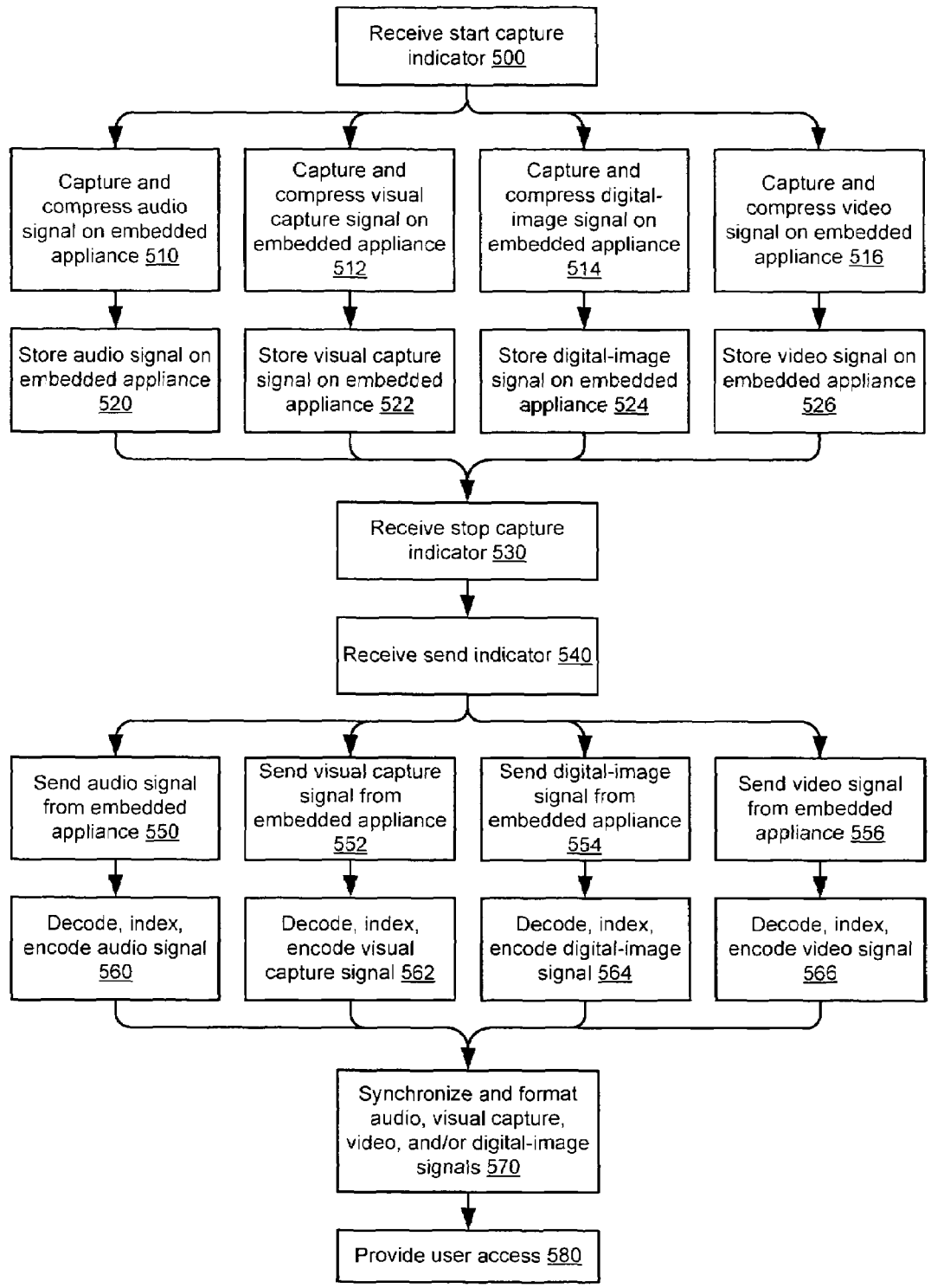
FIG. 5 is a flowchart that illustrates the capturing, processing, storing and/or sending of media signals using an embedded appliance, according to an embodiment of the invention.

FIG. 5 is a flowchart illustrating the capturing, processing, storing and/or sending of media signals using an embedded appliance according to an embodiment of the invention. The flowchart shows that the embedded appliance receives a start capture indicator at 500. The start capture indicator indicates when the embedded appliance is to capture real-time media signals. The start capture indicator at 500 can indicate that the embedded appliance is to start capturing media signals immediately upon their creation, according to a schedule, or at a subsequent user-specified time. The start capture indicator at 500 can also indicate that the embedded appliance is to capture a subset of media signals, for example, only an audio signal and a visual-capture signal.

As shown in FIG. 5, the embedded appliance captures and compresses media signals in response to the start capture indicator at 510, 512, 514 and 516. More specifically, the embedded appliance captures and compresses an audio signal at 510, a visual-capture signal at 512, a digital-image signal at 514 and a video signal at 516. Although FIG. 5 shows the capturing, processing, etc. of each of these types of media signals separately, the rest of the discussion related to FIG. 5 will make reference only to the collective media signals rather than to each individual media signal. Also, although the flowchart shows all of the media signals, the embedded appliance can capture, process, store and send any combination of the media signals. The embedded appliance can, for example, capture more than one audio signal and a single visual-capture signal without capturing a digital-image signal or a video signal.

After the media signals have been captured and compressed at 510-516, the respective captured media signals are stored on the embedded appliance at 520-526. In this embodiment, the media signals are stored locally on the embedded appliance, but in some embodiments, the media signals can be stored, for example, on a remote database that can be accessed by the embedded appliance. The flowchart shows the capturing and compressing at 510-516 and storing at 520-526 of the media signals as discrete steps, but the media signals are continuously captured and compressed at 510-516 and continuously stored at 520-526 until the embedded appliance receives a stop capture indicator at 530. The stop indicator at 530 indicates that the embedded appliance is to stop capturing, compressing and storing media signals.

The start capture indicator at 500 and the stop capture indicator at 530 can be generated by the embedded appliance or by a control server according to a schedule or according to defined criteria. In some embodiments, separate stop and start indicators can be sent to capture the different media signals. Although not shown in this flowchart, the capturing, compressing and storing of media signals can be paused and resumed at any time. The pausing can be prompted using a stop capture indicator and the resuming can be prompted by a start capture indicator generated by for example a control server or by the embedded appliance.

The embedded appliance receives a send indicator at 540 indicating that the embedded appliance is to send the stored media signals. The send indicator at 540 can be generated by the embedded appliance or by a control server according to, for example, a schedule. The send indicator at 540 can indicate that the embedded appliance is to send stored media signals immediately or at a later specified time. The send indicator at 540 can also indicate that the embedded appliance is to send only a portion of one or more stored media signals, for example, only a portion of a captured, compressed and stored digital-image signal.

The signals are sent from the embedded appliance at 550-556 in response to the send indicator received at 540. The media signals are then decoded, processed for indexing and encoded at 560-566, and synchronized and formatted at 570. Any portion of the decoding, indexing and encoding at 560-566 and synchronizing and formatting at 570 can be performed at the embedded appliance or at a control server. For example, indexing (e.g., scene detection) of a video signal can be performed at the embedded appliance before the embedded appliance sends the video signal to, for example, a control server.

After the media signals have been synchronized and formatted at 570, the media signals are made available to a user for accessing 580. The media signals are synchronized according to the markings creating during the indexing at 560-566. The media signals can be formatted into one or more types of formats. The user can access the signals at, for example, a control server and/or a server(s) (e.g., server configured as a course management system) over a network connection from a personal computer using a username and password.

In conclusion, among other things, an apparatus and method for capturing, processing, storing and/or sending media signals using an embedded appliance is described. While various embodiments of the invention have been described above, it should be understood that they have been presented by way of example only and various changes in form and details may be made. For example, processors and/or modules of an embedded appliance can be included on separate electronic boards in one or more housings.

What is claimed is:

1. A method, comprising:
capturing an audio signal on a processor system of a specific-purpose embedded appliance;
capturing on the processor system at least any one of a visual-capture signal or a digital-image signal, the specific-purpose embedded appliance being dedicated to capturing, processing, storing and sending a plurality of real-time media signals, the plurality of media signals including the audio signal and the at least one of the visual-capture signal or the digital-image signal;
receiving a start indicator configured to trigger the capturing of the audio signal on the processor system or the capturing on the processor system at least any one of the visual-capture signal or the digital-image signal, the start indicator being received from a control server separate from the specific-purpose embedded appliance; and
sending at least any one of the audio signal, the visual-capture signal, or the digital-image signal based on a send indicator received from the control server, the send indicator being defined at the control server based on a schedule.

2. The method of claim 1, further comprising:
compressing on the processor system at least any one of the audio signal or the at least any one of the visual-capture signal or digital-image signal.

3. The method of claim 1, further comprising:
synchronizing the audio signal with the at least any one of the visual-capture signal or the digital-image signal.

4. The method of claim 1, further comprising:
detecting a physical security breach of the specific-purpose embedded appliance; and
sending an alarm indicator when the security breach is detected, the alarm indicator including an identifier associated with the embedded appliance.

5. The method of claim 1, wherein the processor system includes at least any one of a processor, an embedded processor or a co-processor configured to operate in an embedded environment of the specific-purpose embedded appliance.

6. The method of claim 1, further comprising:
splitting on the specific-purpose embedded appliance the visual-capture signal into a first visual-capture signal including content that is the same as content of a second visual-capture signal, the second visual-capture signal being synchronized and stabilized on the specific-purpose embedded appliance; and
sending the second visual-capture signal to an external device configured to at least one of process or display the second visual-capture signal.

7. The method of claim 1, wherein the capturing includes shunting the at least one of the visual-capture signal or the digital-image signal to an external device configured to at least one of process or display the visual-capture signal.

8. The method of claim 1, wherein the processing includes at least one of compressing, indexing, encoding, decoding, synchronizing or formatting the plurality of real-time media signals, the processing is triggered based on the schedule.

9. The method of claim 1, wherein the sending includes sending to the control server from a plurality of control servers via a network.

10. The method of claim 1, further comprising:
receiving a preferred transmission time from the control server via a network; and
sending at least any one of the audio signal, the visual-capture signal, or the digital-image signal based on the preferred transmission time.

11. An apparatus, comprising:
a plurality of input ports dedicated to receiving a real-time media signal, the plurality of input ports including an audio input port and at least any one of a visual-capture input port or a digital-image input port;
a processor system dedicated to capturing, sending, processing, and storing the real-time media signal, the processor system defining an embedded environment, the processor system configured to define a confidence monitoring signal based on at least a portion of the real-time media signal, the processor system configured to send the confidence monitoring signal to a control server separate from the specific-purpose embedded appliance via a network,
the plurality of input ports and the processor system being integrated within a multimedia capture device, the processor system configured to receive a schedule from the control server; and
a memory configured to store the schedule, the processor system to capture the real-time media signal starting at a first time based on the schedule, the processor system to send the real-time media signal based on the schedule at a second time after the real-time media signal has been stored, at a third time after the first time, at the multimedia capture device.

12. The apparatus of claim 11, wherein the processor system is configured to operate based on a hardened operating system integrated into the embedded environment, the hardened operating system is configured to allow the capturing, sending, processing, and storing of the real-time media signal without providing support for installation of a general purpose application.

13. The apparatus of claim 11, wherein the processor system includes a single processor.

14. The apparatus of claim 11, further comprising a co-processor configured to control, based on a schedule, a processor from the processor system.

15. The apparatus of claim 11, further comprising:
a scheduler configured to communicate with the processor system, the scheduler is configured to send a start indicator to start the receiving the real-time media signal at the multimedia capture device based on the schedule.

16. The apparatus of claim 11, wherein
the memory is configured to communicate with the processor system, the memory is configured to store the real-time media signal until the real-time media signal is sent to the control server based on the schedule.

17. The apparatus of claim 11, further comprising:
an alarm module configured to send an alarm indicator to the control server when a physical security breach associated with the multimedia capture device is detected.

18. The apparatus of claim 11, further comprising:
a compression module configured to compress the real-time media signal associated with the audio input port and the least any one of the visual-capture input port or the digital-image input port.

19. The apparatus of claim 11, further comprising at least any one of an Ethernet switch, a power over Ethernet (PoE) port, a visual-capture signal splitter, a visual-capture signal distribution amplifier, or a visual-capture sync stabilizer.

20. The apparatus of claim 11,
wherein the schedule is configured to trigger the processor system to send the real-time media signal based on a network traffic condition.

21. An apparatus, comprising:
at least any one of (1) a visual-capture processor module configured to receive a visual-capture signal and to operate based on a hardened operating system (OS) integrated into an embedded environment, or (2) a digital-image processor module configured to receive a digital-image signal and operate based on the hardened OS; and an audio processor module configured to receive an audio signal having a synchronized relationship with the at least any one of the visual-capture signal or the digital-image signal, the audio processor module configured to operate based on the hardened OS, the visual-capture processor module or the digital-image processor module, and the audio processor module collectively defining at least a portion of a specific-purpose embedded appliance, the specific-purpose embedded appliance configured to receive a start indicator configured to trigger the receiving of the audio signal or the receiving of at least any one of the visual-capture signal or the digital-image signal, the start indicator being defined at a control server separate from the specific-purpose embedded appliance, the specific-purpose embedded appliance configured to send at least any one of the audio signal or the at least any one of the visual-capture signal or the digital-image signal based on a send indicator received from the control server, the send indicator being defined at the control server based on a schedule.

22. The apparatus of claim 21, wherein the hardened OS is configured such that access to the audio processor module and the at least any one of the visual-capture processor module or the digital-image processor module is limited to at least one predefined user.

23. The apparatus of claim 21, wherein the audio processor module is configured to compress the audio signal simultaneously into multiple formats.

24. The apparatus of claim 21, wherein the at least any one of the digital-image processor module is configured to compress the digital-image signal or the visual-capture processor module is configured to compress the visual-capture signal.

25. The apparatus of claim 21, wherein the at least any one of the visual-capture processor, the digital-image processor module or the audio processor module are included in at least any one of an embedded processor or a co-processor.

26. The apparatus of claim 21, wherein the hardened OS is configured to allow the capturing, sending, processing, and storing of a plurality of read-time media signals without providing support for installation of a general purpose application, the plurality of real-time media signals includes the visual-capture signal, the digital image signal, and the audio signal.

* * * * *